(12) United States Patent
Tomamoto et al.

(10) Patent No.: US 10,781,036 B2
(45) Date of Patent: Sep. 22, 2020

(54) GLASS ROLL WITH A SEPARABLE PROTECTIVE SHEET

(71) Applicant: Nippon Electric Glass Co., Ltd., Shiga (JP)

(72) Inventors: Masahiro Tomamoto, Shiga (JP); Michiharu Eta, Shiga (JP); Hidetaka Oda, Shiga (JP); Tatsuya Takaya, Shiga (JP); Yasuo Yamazaki, Shiga (JP); Hiroshi Takimoto, Shiga (JP); Shinichi Ishibashi, Shiga (JP); Keiji Takagi, Shiga (JP); Daisuke Nagata, Shiga (JP); Takahide Nakamura, Shiga (JP); Toru Sakurabayashi, Shiga (JP); Katsutoshi Fujiwara, Shiga (JP); Mitsuharu Noda, Shiga (JP); Yasuhiko Ogiso, Shiga (JP); Takahide Fujii, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 1244 days.

(21) Appl. No.: 14/327,673

(22) Filed: Jul. 10, 2014

(65) Prior Publication Data

US 2014/0319001 A1    Oct. 30, 2014

Related U.S. Application Data

(63) Continuation of application No. 13/120,981, filed as application No. PCT/JP2009/066998 on Sep. 30, 2009, now Pat. No. 8,806,894.

(30) Foreign Application Priority Data

Oct. 1, 2008   (JP) .................................. 2008-256509
Oct. 28, 2008  (JP) .................................. 2008-277121
Sep. 8, 2009   (JP) .................................. 2009-207431

(51) Int. Cl.
  *B32B 17/06*    (2006.01)
  *B65D 85/48*    (2006.01)

(52) U.S. Cl.
  CPC ............ *B65D 85/48* (2013.01); *B32B 17/064* (2013.01); *B65H 2301/4127* (2013.01);
  (Continued)

(58) Field of Classification Search
  CPC ....... B32B 17/06; B32B 17/064; B65D 85/48; B65D 85/672; B65D 57/00; B65D 85/30;
  (Continued)

(56) References Cited

U.S. PATENT DOCUMENTS 3,089,801 A    5/1963   Tierney et al.
3,261,460 A    7/1966   Davis
(Continued)

FOREIGN PATENT DOCUMENTS

CA    2 359 366    7/2000
CN    1341083      3/2002
(Continued)

OTHER PUBLICATIONS

Japanese Office Action dated Nov. 2, 2015 in corresponding Japanese Application No. 2014-137078 (with partial English translation).

(Continued)

*Primary Examiner* — Elizabeth A Robinson
*Assistant Examiner* — Julius Fitzhugh
(74) *Attorney, Agent, or Firm* — Wenderoth, Lind & Ponack, L.L.P.

(57) ABSTRACT

A glass roll includes a glass film formed by a downdraw method. The glass film is wound into a roll using a winding roller in a state in which front and back glass surfaces of the glass film formed in the forming operation are exposed, and during the winding operation, the glass film is superposed on (Continued)

a separable protective sheet. The protective sheet extends beyond both sides in a width direction of the glass film. The protective sheet can further be wound on an outer peripheral surface of the glass film by winding only the protective sheet from a trailing end of the glass film in a winding direction of the glass film.

6 Claims, 7 Drawing Sheets

(52) U.S. Cl.
CPC ... *B65H 2801/61* (2013.01); *Y10T 428/24364* (2015.01); *Y10T 428/24488* (2015.01); *Y10T 428/24752* (2015.01); *Y10T 428/26* (2015.01)

(58) Field of Classification Search
CPC ............ B65H 18/28; B65H 2301/4127; B65H 2801/61; B65H 16/00; B65H 18/00; B65H 20/00; B65H 2301/414; B65H 2301/41427; B65H 2511/142; B65H 2515/312; B65H 2515/37; B65H 2701/17; C03B 17/06; Y10T 428/24364; Y10T 428/26; Y10T 428/24488; Y10T 428/24752
USPC ... 428/210, 34.6, 34.7, 426, 142, 34.1, 34.4, 428/157, 189, 332; 162/107; 65/53, 65/60.1, 90, 94
See application file for complete search history.

(56) References Cited

U.S. PATENT DOCUMENTS

| | | | |
|---|---|---|---|
| 3,685,644 A | | 8/1972 | Cothran et al. |
| 4,455,076 A | * | 6/1984 | Birkeland ............ G03B 17/305 242/348.4 |
| 4,485,125 A | | 11/1984 | Izu et al. |
| 5,125,630 A | * | 6/1992 | Hoyt ..................... G03B 17/26 242/417.1 |
| 5,472,089 A | * | 12/1995 | Specogna ............ G03B 27/588 206/410 |
| 6,092,392 A | | 7/2000 | Verlinden et al. |
| 6,233,972 B1 | * | 5/2001 | Foster ..................... C03C 17/32 427/154 |
| 6,350,489 B1 | | 2/2002 | Moriyama et al. |
| 6,502,423 B1 | | 1/2003 | Ostendarp et al. |
| 6,815,070 B1 | | 11/2004 | Bürkle et al. |
| 7,059,154 B1 | | 6/2006 | Quentin et al. |
| 2002/0007607 A1 | | 1/2002 | Matlack et al. |
| 2002/0106178 A1 | | 8/2002 | Bumgarner et al. |
| 2004/0251290 A1 | * | 12/2004 | Kondratenko ......... B23K 26/14 225/2 |
| 2007/0131574 A1 | | 6/2007 | Aoki |
| 2007/0140311 A1 | | 6/2007 | House et al. |
| 2007/0191207 A1 | | 8/2007 | Danielson et al. |
| 2007/0275338 A1 | | 11/2007 | Acker et al. |
| 2008/0050888 A1 | | 2/2008 | Garner et al. |
| 2008/0280057 A1 | | 11/2008 | Hawtof et al. |
| 2009/0088515 A1 | | 4/2009 | Yagyu et al. |
| 2009/0314032 A1 | | 12/2009 | Tomamoto et al. |
| 2010/0065518 A1 | | 3/2010 | Noda et al. |
| 2010/0276066 A1 | | 11/2010 | Kondo |
| 2011/0177290 A1 | | 7/2011 | Tomamoto et al. |
| 2011/0177325 A1 | | 7/2011 | Tomamoto et al. |
| 2011/0200812 A1 | | 8/2011 | Tomamoto et al. |
| 2014/0319001 A1 | | 10/2014 | Tomamoto et al. |

FOREIGN PATENT DOCUMENTS

| | | | | |
|---|---|---|---|---|
| EP | 0 716 339 | | 6/1996 | |
| EP | 0 782 176 | | 7/1997 | |
| EP | 0 808 722 | | 11/1997 | |
| EP | 0 838 723 | | 4/1998 | |
| EP | 2 077 254 | | 7/2009 | |
| EP | 2 204 355 | | 7/2010 | |
| EP | 2 236 281 | | 10/2010 | |
| EP | 2 332 856 | | 6/2011 | |
| EP | 2 336 050 | | 6/2011 | |
| EP | 2 343 248 | | 7/2011 | |
| GB | 503557 | | 4/1939 | |
| JP | 48-018360 | | 6/1973 | |
| JP | 58-203867 | | 11/1983 | |
| JP | 1-500990 | | 4/1989 | |
| JP | 2-1503 | | 1/1990 | |
| JP | 2-48577 | | 4/1990 | |
| JP | 3-128847 | | 5/1991 | |
| JP | 8-283041 | | 10/1996 | |
| JP | 10-338548 | | 12/1998 | |
| JP | 11-043180 | | 2/1999 | |
| JP | 2001-097733 | | 4/2001 | |
| JP | 2001-318219 | | 11/2001 | |
| JP | 2002-534305 | | 10/2002 | |
| JP | 2002-544104 | | 12/2002 | |
| JP | 2004-505881 | | 2/2004 | |
| JP | 2005-075433 | | 3/2005 | |
| JP | 2005-144858 | | 6/2005 | |
| JP | 2005-225925 | | 8/2005 | |
| JP | 2005-231657 | | 9/2005 | |
| JP | 2005-239242 | | 9/2005 | |
| JP | 2005-255225 | | 9/2005 | |
| JP | 2006-184741 | | 7/2006 | |
| JP | 2006-264786 | | 10/2006 | |
| JP | 2006-347783 | | 12/2006 | |
| JP | 2007-039092 | | 2/2007 | |
| JP | 2007-106418 | | 4/2007 | |
| JP | 2007-119322 | | 5/2007 | |
| JP | 2007-269391 | | 10/2007 | |
| JP | 2008-133174 | | 6/2008 | |
| JP | 2008-209906 | | 9/2008 | |
| TW | 200516502 | | 5/2005 | |
| TW | M298580 | | 10/2006 | |
| TW | 200831371 | | 8/2008 | |
| WO | 87/06626 | | 11/1987 | |
| WO | WO 8706626 A1 | * | 11/1987 | ............ C03C 17/002 |
| WO | WO 0041978 A1 | * | 7/2000 | ............... B32B 3/04 |
| WO | 02/14229 | | 2/2002 | |
| WO | 2006/009225 | | 1/2006 | |
| WO | 2007/111221 | | 10/2007 | |
| WO | 2008/050605 | | 5/2008 | |
| WO | 2008/123124 | | 10/2008 | |
| WO | 2009/057460 | | 5/2009 | |
| WO | 2009/093505 | | 7/2009 | |

OTHER PUBLICATIONS

Taiwanese Office Action dated Feb. 17, 2016 in counterpart Taiwanese Patent Application No. 103133515 (partial English translation).
Taiwanese Office Action dated Feb. 17, 2016 in counterpart Taiwanese Patent Application No. 103133514 (partial English translation).
Taiwanese Office Action dated Feb. 17, 2016 in counterpart Taiwanese Patent Application No. 103133513 (partial English translation).
Office Action dated Aug. 9, 2016 in corresponding European Application No. 09 817 790.0.
Taiwanese Office Action and Search Report dated Jun. 16, 2015 in corresponding Taiwanese Application No. 098133246 (with English translation).
International Search Report dated Nov. 24, 2009 in International (PCT) Application No. PCT/JP2009/066998.
International Preliminary Report on Patentability and Written Opinion of the International Searching Authority dated May 19, 2011 in International (PCT) Application No. PCT/JP2009/066998.
Supplementary European Search Report dated Jul. 27, 2012 in European Patent Application No. 09817792.6.
Supplementary European Search Report dated Oct. 26, 2012 in corresponding European Application No. 09817791.8.

(56) References Cited

OTHER PUBLICATIONS

Supplementary European Search Report dated Mar. 4, 2013 in corresponding European Patent Application No. 09817789.2.
Supplementary European Search Report dated Mar. 26, 2013 in corresponding European Patent Application No. 09817793.4.
Supplementary European Search Report dated Mar. 13, 2013 in corresponding European Patent Application No. 09817790.0.
Japanese Office Action, with partial English translation, dated Jun. 28, 2013 in corresponding Japanese Patent Application No. 2009-214858.
Japanese Office Action, with partial English translation, dated Jun. 28, 2013 in corresponding Japanese Patent Application No. 2009-214860.
Japanese Office Action, with partial English translation, dated Jun. 28, 2013 in corresponding Japanese Patent Application No. 2009-217055.
Office Action dated Sep. 20, 2017 in corresponding Japanese Application No. 2014-156486, with English Translation.

* cited by examiner

GLASS ROLL WITH A SEPARABLE PROTECTIVE SHEET

This is a Continuation application of U.S. application Ser. No. 13/120,981, which is the U.S. National Stage of International Application No. PCT/JP2009/066998, filed Sep. 30, 2009, which claims priority to Japanese Patent Application No. 2008-256509, filed Oct. 1, 2008, Japanese Patent Application No. 2008-277121, filed Oct. 28, 2008, and Japanese Patent Application 2009-207431, filed Sep. 8, 2009, the contents of which are all hereby incorporated by reference.

TECHNICAL FIELD

The present invention relates to an improved technology for a package form for a glass film which is used as a glass substrate for a flat panel display and a solar cell, and used as cover glass or the like for an organic light-emitting diode (OLED) lighting.

BACKGROUND ART

In view of space saving, in recent years, there is widely used a flat panel display, such as a liquid crystal display, a plasma display, an organic light-emitting diode (OLED) display, or a field emission display, in place of a cathode ray tube (CRT) display that has been conventionally and widely used. Such a flat panel display is required to be further thinned. In particular, the OLED display is required to allow easy carrying by being folded or wound, and to allow use not only on a flat surface but also on a curved surface. Further, uses on both flat surfaces and curved surfaces are not limited to only display devices. For example, it is also required to form a solar cell or an OLED lighting, on a surface of a product having a curved surface, such as a surface of a vehicle body of an automobile or a roof, a pillar, or an outer wall of a building. Therefore, various glass plates including the flat panel display are required to be further thinned for satisfying a demand for flexibility high enough to deal with a curved surface. As disclosed, for example, in Patent Literature 1, a film-like sheet glass having a thickness of 200 µm or less has been developed.

Meanwhile, in view of ensuring flexibility, a resin film may be used in place of a glass plate. However, there is a problem in that the resin film is inferior to the glass plate in gas barrier property. In a case of the OLED display, a light-emitting body to be used is deteriorated due to contact with gas, such as oxygen or water vapor, and hence the resin film inferior in barrier property cannot be used in place of the glass plate. Further, for the same reason, also in a field other than the OLED display, the resin film cannot be used in place of the glass plate in many cases. Therefore, also in view of ensuring the barrier property described above, thinning of the glass plate takes on increasing importance in actual use.

However, when the glass plate is thinned into a film, i.e., a so-called glass film, breakage is more liable to occur. Consequently, a package form used for transportation or the like becomes a major issue. Specifically, as a package form for a glass plate, there are known a package form (see Patent Literature 2, for example) in which glass plates and protective sheets are packaged while being alternately propped at a predetermined angle on a pallet including a back surface portion, and a package form (see Patent Literature 3, for example) in which glass plates and protective sheets are packaged while being alternately and horizontally stacked on a pallet. However, when the above-mentioned package forms are adopted to the glass film, the following problems arise.

That is, when adopting the former package form, there is a problem in that it is extremely difficult to maintain a posture in the propped state due to flexibility of the glass film. Further, even if the glass film can be propped, there is a problem in that the glass film easily breaks due to its extreme bending or concentration of stress applied on a very fragile lower end portion of the glass film.

In contrast, when adopting the latter package form, load of all glass films situated on an upper side is applied to glass films situated on a lower side, and hence there is a problem in that the glass films situated on the lower side easily break.

Note that, when glass films are packaged while being stacked in horizontal postures in an up-and-down direction, as disclosed, for example, in Patent Literature 4, there may be adopted a package form in which glass plates are stacked in the up-and-down direction at intervals. However, in this package form, the glass films need to be placed so that the glass plates are placed in a straddling manner on a plurality of support members arranged in parallel in a horizontal direction at intervals, and hence the package form is not suitable for packaging the glass film having flexibility. That is, the glass film has flexibility, and hence it is difficult to place the glass film in a straddling manner on the support members, and placing of the glass film forces a complicated operation. Further, even if the glass film can be placed, all load of the glass film is supported only by contact portions with the support members, and hence stress is concentrated on the supported portions so that the glass film may break. Further, the glass film is bent downward due to its self-weight, and hence the glass film situated on the upper side may be held in direct contact with the glass film situated on the lower side, to thereby cause breakage.

Therefore, for the package form for a glass film, it is desired to develop a unique package form for a glass film, which is different from conventional package forms for a relatively thick glass plate. In this context, for example, Patent Literature 5 discloses a new package form in which a composite film is wound into a roll together with an intermediate layer, the composite film including a glass film and a polymer layer coated on an entire one-side surface of the glass film. This package form is made focusing on flexibility of the glass film, and may be effective as the package form for a glass film.

CITATION LIST

Patent Literature

Patent Literature 1: JP 2008-133174 A
Patent Literature 2: JP 2005-231657 A
Patent Literature 3: JP 2006-264786 A
Patent Literature 4: JP 2005-75433 A
Patent Literature 5: JP 2002-534305 A

SUMMARY OF INVENTION

Technical Problem

By the way, in the composite film disclosed in Patent Literature 5, the polymer layer is formed on the entire one-side surface of the glass film. This aims at prevention of breakage of the glass film. Further, the polymer layer is formed just before winding of the composite film. Specifically, after forming of the glass film, while the glass film is conveyed in a horizontal posture, polymer is applied on an upper surface of the glass film. Then, the polymer is irradiated with ultraviolet rays in a downstream step to cure the polymer, and the polymer is dried in a drying line, to thereby form the polymer layer.

However, when the polymer layer is formed on the surface of the glass film as described above, a large number of steps are necessary, such as the above-mentioned application of the polymer. Consequently, not only are the steps complicated, but an entire length of the steps is also extremely extended only for formation of the polymer layer. As a result, there is increased a risk in that foreign matters adhere to the surface of the glass film, and hence it is difficult to ensure cleanness of the surface of the glass film.

Further, after curing and drying the polymer layer formed on the surface of the glass film, the composite film is wound. Thus, in a case where the polymer layer is not completely cured at the winding stage, the polymer layer may stick to the intermediate layer. In a case of occurrence of the stickiness, when unpackaging the composite film wound into a roll, there is a fear in that the intermediate layer and the polymer layer cannot be easily separated from each other, or the glass film breaks when performing forcible separation.

In addition, the glass film is rarely incorporated into an end product such as a flat panel display while remaining in a state of the composite film including the polymer layer formed on the glass film. Usually, it is necessary to remove the polymer layer in advance before incorporation into the end product. In this case, after unpackaging the composite film wound into a roll, it is necessary to provide an additional step for removing the polymer layer, which becomes a factor in an increase in manufacturing cost similarly to the forming step for the polymer layer. Moreover, when the polymer layer is not satisfactorily removed, the residual polymer layer may serve as foreign matters on the surface of the glass film, which may lead to a big problem such as degradation in value of the end product incorporating the glass film and degradation in function.

Therefore, the package form disclosed in Patent Literature 5 also has the above-mentioned problems, and is still susceptible to improvement.

In view of the above-mentioned circumstances, it is a technical object of the present invention to provide a package form, in which cleanness of a glass film is ensured and the glass film is prevented from breaking. The package form is effective in minimizing the number of glass film processing steps to be performed before packaging and after unpackaging.

Solution to Problem

The present invention, which has been made to solve the above-mentioned problems, provides a glass roll, which is formed by winding a glass film into a roll while superposing the glass film on a protective sheet, the glass film being formed by a downdraw method and having exposed front and back surfaces.

With this configuration, the glass film having the exposed front and back surfaces, which is formed by the downdraw method, is wound into a roll as it is together with the protective sheet, to thereby form the glass roll. Thus, in a step before packaging, it is unnecessary to perform, on both of the front and back surfaces of the glass film, a layer-forming step of forming a protective layer such as a polymer layer. Also in a step after unpackaging, it is unnecessary to perform a removing step of removing the protective layer such as the polymer layer from a surface of the glass film. Therefore, it is possible to reduce a length of the step before packaging by reducing length corresponding to a length of the step for forming the protective layer. Thus, an adhesion rate of foreign matters to the front and back surfaces of the glass film can be reduced as much as possible, and no foreign matters resulting from the protective layer remain after unpackaging. As a result, it is possible to satisfactorily maintain cleanness of the front and back surfaces of the glass film formed by the downdraw method. In addition, unlike ones formed by a float method, the front and back surfaces formed by the downdraw method are advantageous in ensuring cleanness in an unpolished state without performing ex-post surface polishing on the glass film.

Further, in a state of the glass roll, the exposed front and back surfaces of the glass film are protected with the protective sheet. Moreover, the front and back surfaces of the glass film are glass surfaces without the protective layer such as the polymer layer, and hence the glass film and the protective sheet are less likely to stick to each other at a winding stage. Therefore, it is possible to reliably reduce breakage of the glass film in the state of the glass roll, and to satisfactorily maintain separability between the glass film and the protective sheet. Accordingly, breakage of the glass film at the time of unpackaging can be reduced as much as possible.

Note that, even if the glass film is kept in a wound state for a long period of time, no warpage is generated, and hence the glass film can be easily sent into a subsequent step. In addition, owing to winding, the glass film as a long product can be used, and hence the glass film can be cut into a free length afterward, and can correspond to substrates with various sizes. Consequently, it is possible to prevent waste of the glass film.

In the above-mentioned configuration, it is preferred that the glass film have a thickness of 1 μm or more and 200 μm or less.

With this, appropriate flexibility is imparted to the glass film. Thus, it is possible to alleviate overstress applied to the glass film when the glass film is wound, and to prevent the glass film from breaking.

In the above-mentioned configuration, it is preferred that each end surface in a width direction of the glass film have an arithmetic average roughness Ra of 0.1 μm or less. Here, the "arithmetic average roughness Ra" is a value measured with reference to JIS B0601:2001.

With this, appropriate smoothness is imparted to the each end surface in the width direction of the glass film. Thus, when winding the glass film into a roll, small flaws are less likely to occur on the each end surface of the glass film, and hence it is possible to prevent breakage of the glass film from the each end surface. Therefore, it is possible to reduce glass powder (cullet) generated due to chips resulting from the small flaws on the end surface of the glass film, which is very advantageous in ensuring cleanness of the front and back surfaces of the glass film. Further, even in a case where the end surface of the glass film is held in contact with the protective sheet, the end surface of the glass film does not bite into and scratch the protective sheet, and hence satisfactory separability between the glass film and the protective sheet can be obtained.

In the above-mentioned configuration, it is preferred that the each end surface in the width direction of the glass film include a cut surface which is cut by laser cutting. Note that, the laser cutting described herein includes laser splitting besides laser fusing.

With this, without performing post-processing such as polishing, appropriate smoothness can be easily imparted to the cut surface constituting the each end surface in the width direction of the glass film. Thus, when winding the glass film into a roll, chips resulting from small flaws are less likely to occur on the each end surface of the glass film. Therefore, it is possible to reduce glass powder generated due to the chips on the end surface of the glass film, which is very advantageous in ensuring cleanness of the front and back surfaces of the glass film. Further, even in the case where the end surface of the glass film is held in contact with the protective sheet, the end surface of the glass film does not bite into the protective sheet, and hence satisfactory separability between the glass film and the protective sheet can be maintained.

In the above-mentioned configuration, the protective sheet may extend beyond both sides in the width direction of the glass film.

With this, the each end surface in the width direction of the glass film can be protected with the protective sheet. Further, each end in the width direction of the glass film is covered with the protective sheet, and hence it is also possible to prevent intrusion of foreign matters from an outside.

In the above-mentioned configuration, it is preferred that the protective sheet serve as an outermost layer.

With this, in the state of the glass roll, the glass film is not exposed at the outermost layer, and hence this is preferred also in view of preventing breakage of the glass film. That is, even when another member such as another glass roll comes into contact with the outermost layer of the glass roll, the outermost layer of the glass roll is covered with the protective sheet, and hence the glass film is less likely to break (i.e., have flaws or cracks) directly. Further, the outermost layer is protected with the protective sheet, which is advantageous in ensuring cleanness of the glass film.

In the above-mentioned configuration, it is preferred that the protective sheet serve as an innermost layer.

With this, in the state of the glass roll, the glass film is not exposed at the innermost layer, and hence this is preferred also in view of preventing breakage of the glass film. Specifically, for example, even in a case where the glass film is wound into a roll with use of a roll core, the glass film and the roll core are not held in direct contact with each other. Further, even in a case where the roll core is removed from a center of the glass roll, or the roll core needs to be inserted into the center of the glass roll afterward, the protective sheet is interposed between the glass film and the roll core, and hence the surface of the glass film is less likely to break (i.e., have flaws) by being rubbed against the roll core.

In the above-mentioned configuration, the protective sheet may be formed of a resin sheet.

With this, cushioning performance of the protective sheet is improved, which is advantageous in reducing breakage of the glass film.

In this case, when the protective sheet is formed of a foamed resin sheet, more satisfactory cushioning performance is obtained, and hence this is more preferred in view of reducing breakage of the glass film.

The present invention, which has been made to solve the above-mentioned problems, provides a manufacturing device for a glass roll, including: a forming section for forming a glass film by a downdraw method; and a winding roller for winding the glass film while superposing the glass film on a protective sheet. The manufacturing device has a configuration in which the winding roller winds the glass film while superposing the glass film on the protective sheet under a state in which front and back surfaces of the glass film are exposed.

With this configuration, it is possible to obtain the same action and effect as those of the above-mentioned corresponding configuration.

In the above-mentioned configuration, it is preferred that the manufacturing device for a glass roll further include cutting means for laser cutting a disused portion on a conveyance path ranging from the forming section to the winding roller, the disused portion being formed on each end portion in a width direction of the glass film.

With this, it is possible to obtain the same action and effect as those of the above-mentioned corresponding configuration.

In the above-mentioned configuration, the winding roller may be arranged at a position shifted laterally from a position directly below the forming section, and the glass film drawn out of the forming section may be curved and supplied to the winding roller arranged at the position shifted laterally.

With this, at a position other than the position directly below the forming section, it is possible to perform a winding operation under a state in which a posture of the glass film has been changed from a vertical posture to a horizontal posture.

In this case, it is preferred that an angle formed by a tangent line along the glass film drawn out of the forming section, and a tangent line along the glass film at a contact point between the winding roller and the glass film be 90 degrees or more, and that the glass film drawn out of the forming section be smoothly curved along the two tangent lines.

With this, it is possible to curve the glass film without causing overstress to act on the glass film. Therefore, during the winding operation for the glass film, the glass film is less likely to break from its curved portion, and hence it is possible to continue the stable winding operation.

The present invention, which has been made to solve the above-mentioned problems, provides a manufacturing method for a glass roll, including: forming a glass film by a downdraw method; and winding, by a winding roller, the glass film into a roll while superposing the glass film on a protective sheet under a state in which front and back surfaces of the glass film thus formed are exposed, to thereby form a glass roll.

According to this method, it is possible to obtain the same action and effect as those of the above-mentioned corresponding configuration.

In the above-mentioned method, it is preferred to laser cut a disused portion before a stage of winding the glass film by the winding roller, the disused portion being formed on each end portion in a width direction of the glass film.

According to this method, it is possible to obtain the same action and effect as those of the above-mentioned corresponding configuration.

In the above-mentioned method, the glass film and the protective sheet may be wound under a state in which the protective sheet is arranged on the winding roller side relative to the glass film, and only the protective sheet may be wound from a trailing end in a winding direction of the glass film so that the protective sheet is wound on an outer peripheral surface of the glass film.

With this, even when the glass film and the protective sheet are wound under the state in which the protective sheet is arranged on the winding roller side relative to the glass film, in other words, under a state in which the protective sheet is superposed on an inner circumferential side of the glass film at the time of winding, the outermost layer of the glass roll can be constituted by the protective sheet.

In the above-mentioned method, the glass film and the protective sheet may be wound under a state in which the glass film is arranged on the winding roller side relative to the protective sheet.

With this, when the protective sheet and the glass film are wound while being superposed on each other, the outermost layer of the glass roll is automatically constituted by the protective sheet, and hence it is unnecessary to wind only the protective sheet additionally after winding the glass film.

In the above description, the downdraw method includes a slot downdraw method, an overflow downdraw method, and a redraw method. The overflow downdraw method and the redraw method are advantageous in being able to form a glass film excellent in surface smoothness without performing additional processing after the forming. Therefore, it is preferred that the overflow downdraw method or the redraw method be used as the downdraw method.

Advantageous Effects of Invention

According to the present invention described above, it is possible to provide, as a package form of a glass film, a glass roll with which cleanness of the glass film is ensured and the glass film is prevented from breaking. The glass roll is effective in minimizing the number of glass film processing steps to be performed before packaging and after unpackaging.

BRIEF DESCRIPTION OF DRAWINGS

FIG. 3(*a*) A view illustrating a mode of providing a holding portion to a roll core, and illustrating a mode of holding the glass film and a protective sheet.

FIG. 3(*b*) A view illustrating a mode of providing the holding portion to the roll core, and illustrating a mode of holding only the glass film.

FIG. 7(*a*) A view illustrating a preferred cutting method for the glass film according to the present invention, and illustrating a state in which a scribe line passes pre-cutting rollers.

FIG. 7(*b*) A view illustrating a preferred cutting method for the glass film according to the present invention, and illustrating a state in which bend-breaking is performed.

FIG. 7(*c*) A view illustrating a preferred cutting method for the glass film according to the present invention, and illustrating a state in which a post-cutting end portion passes post-cutting rollers.

DESCRIPTION OF EMBODIMENT

In the following, a glass roll and a manufacturing method for a glass roll according to a preferred embodiment of the present invention are described with reference to the drawings.

Figure 1:
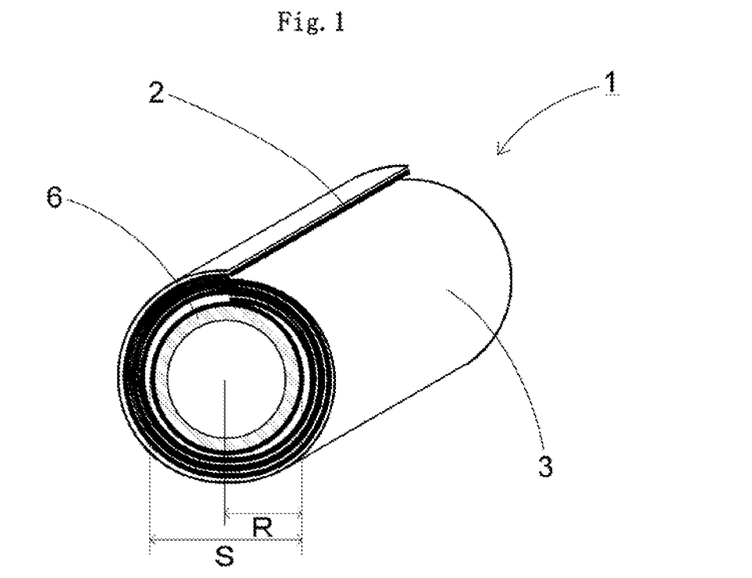
FIG. 1 A perspective view of a glass roll according to the present invention.
Figure 2:
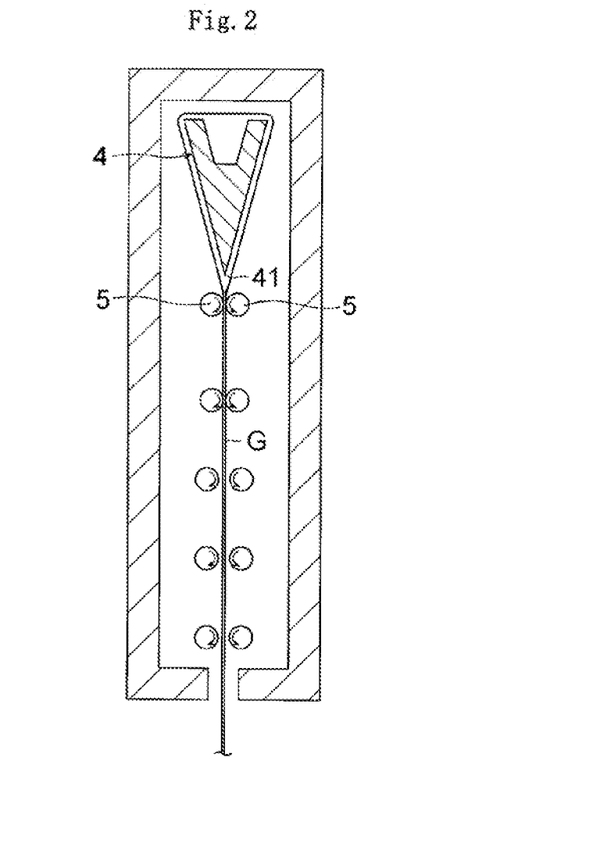
FIG. 2 An explanatory diagram of a manufacturing device for a glass film.
Figure 3A:
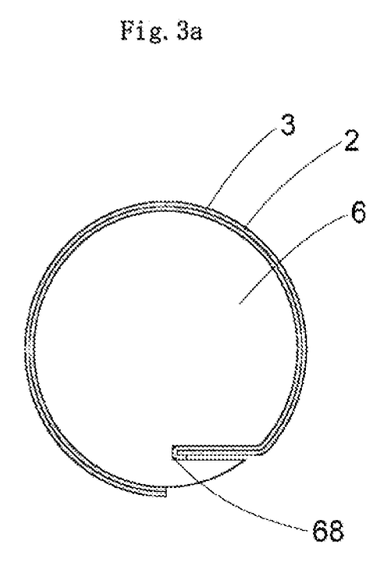
Figure 3B:
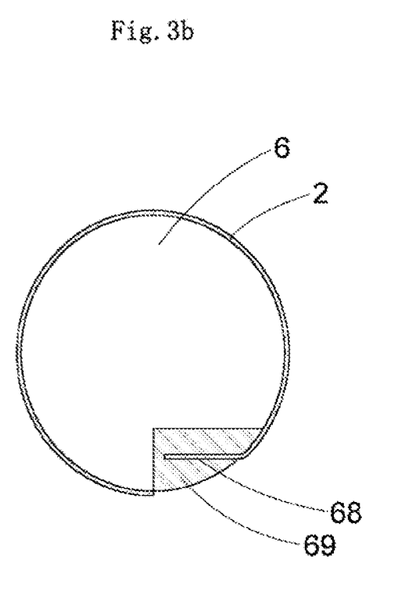
Figure 4:
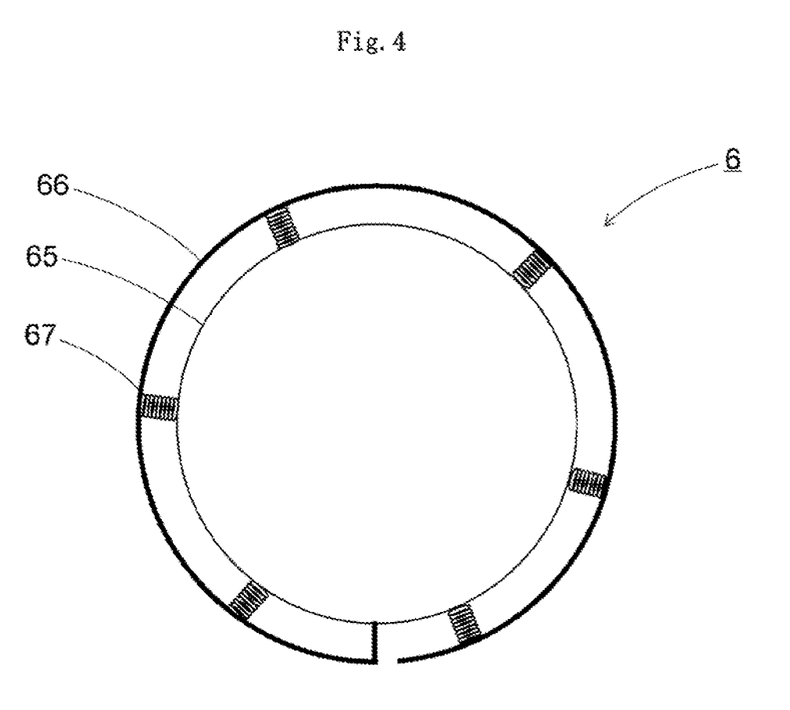
FIG. 4 A view illustrating a mode in which an outer cylinder of the roll core expands and contracts.
Figure 5:
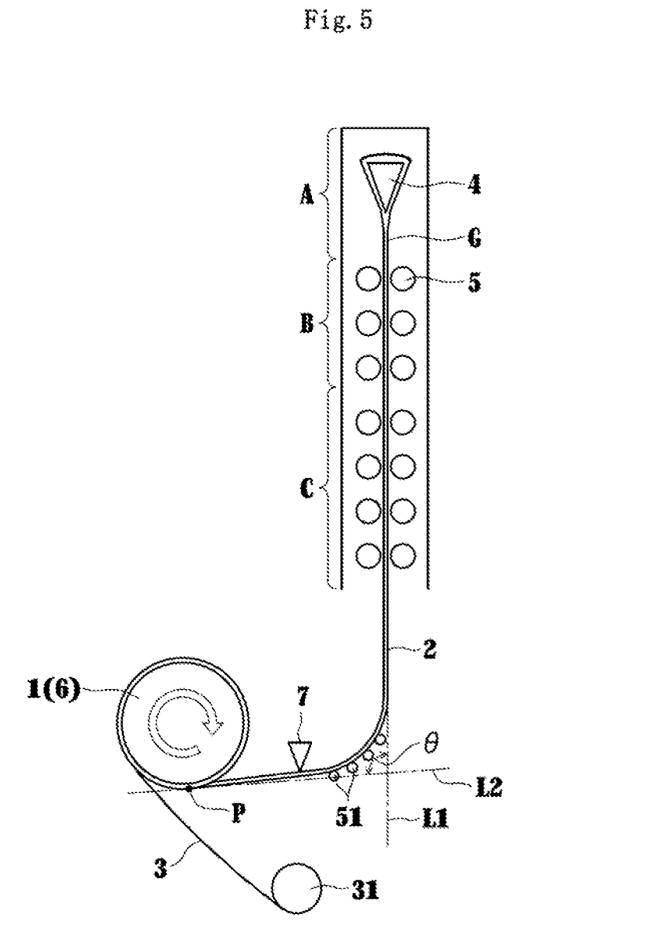
FIG. 5 An explanatory diagram of a manufacturing device for a glass roll according to the present invention.
Figure 6:
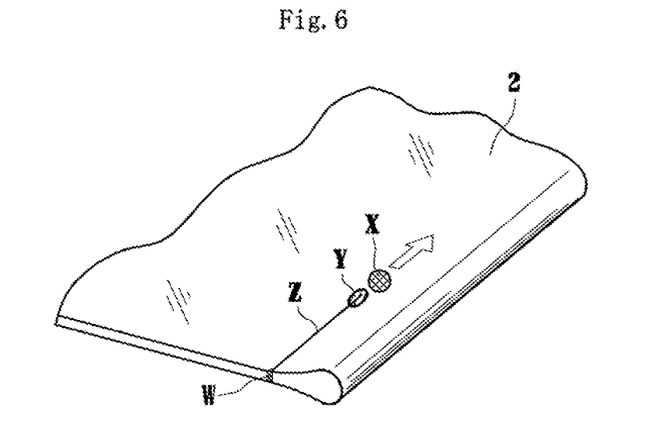
FIG. 6 An explanatory diagram illustrating a method of applying heat of laser irradiation onto the glass film and splitting the glass film using thermal stress caused by the heat.
Figure 7A:
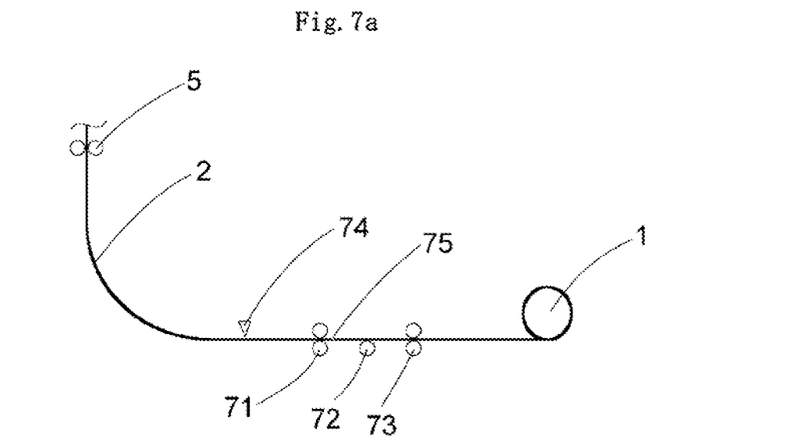
Figure 7B:
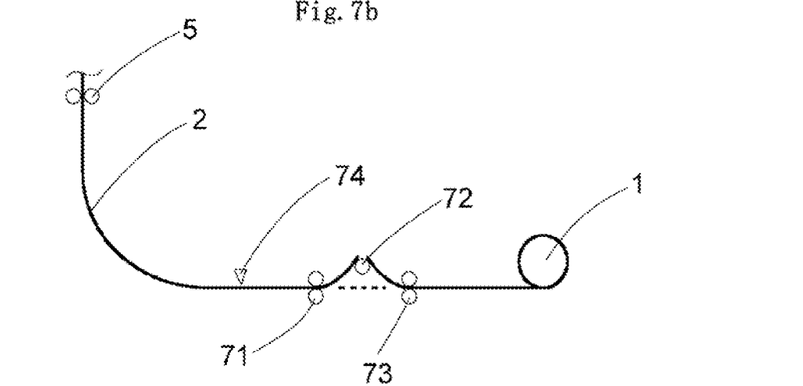
Figure 7C:
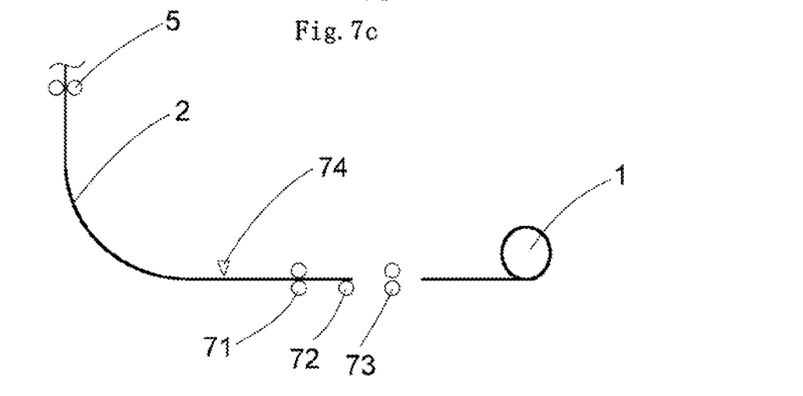

FIG. 1 is a perspective view of the glass roll according to the present invention. FIG. 2 is an explanatory diagram of a manufacturing device for a glass film. FIG. 3 are views each illustrating a mode of providing a holding portion to a roll core, in which Part (a) is a view illustrating a mode of holding the glass film and a protective sheet, and Part (b) is a view illustrating a mode of holding only the glass film. FIG. 4 is a view illustrating a mode in which an outer cylinder of the roll core expands and contracts. FIG. 5 is an explanatory diagram of a manufacturing device for a glass roll according to the present invention. FIG. 6 is an explanatory diagram illustrating a method of applying heat of laser irradiation onto the glass film and splitting the glass film using thermal stress caused by the heat. FIG. 7 are views each illustrating a preferred cutting method for the glass film according to the present invention, in which Part (a) is a view illustrating a state in which a scribe line passes pre-cutting rollers, Part (b) is a view illustrating a state in which bend-breaking is performed, and Part (c) is a view illustrating a state in which a post-cutting end portion passes post-cutting rollers.

As illustrated in FIG. 1, a glass roll (1) according to the present invention is obtained by superposing a glass film (2) onto a protective sheet (3) and winding the glass film and the protective sheet into a roll, the glass film being formed by a downdraw method and having exposed front and back surfaces. That is, the front and back surfaces of the glass film (2) are held in direct contact with the protective sheet (3). Note that, it is preferred that the front and back surfaces of the glass film (2) be not polished.

Silicate glass is used as the glass film (2). Preferably, silica glass or borosilicate glass is used, and most preferably, non-alkali glass is used. When the glass film (2) contains an alkali component, cation substitution occurs on the surfaces, and a phenomenon, so-called white weathering, occurs. As a result, the glass film is structurally rough. In this case, when the glass film (2) is used in a curved state, there is a risk in that the glass film is prone to break from a portion that is weathered over time. Note that, herein, the non-alkali glass includes glass that does not substantially contain an alkali metal oxide, specifically, glass containing an alkali metal oxide of 1000 ppm or less. In the present invention, as the alkali component, the glass film contains preferably the alkali metal oxide of 500 ppm or less, and more preferably the alkali metal oxide of 300 ppm or less.

The glass film (2) is allowed to be wound, and hence is suitable particularly for a long product. That is, a length (long side) of the glass film (2) is preferably 3 times or more, more preferably 5 times or more, and still more preferably 10 times or more longer than a width (short side) of the glass film. Even when the glass film is such a long product, the glass film allows compact package, which is suitable in transportation. The width of the glass film (2) is 12.5 mm or more, and is selected as needed depending on a size of a substrate of a device to be used, such as a small-screen display for a mobile phone or a large-screen display. However, the width of the glass film is preferably 100 mm or more, more preferably 300 mm or more, and still more preferably 500 mm or more.

A thickness of the glass film (2) is more preferably 1 µm to 200 µm, and most preferably 10 µm to 100 µm. The reason is as follows. When the glass film (2) has the thickness described above, it is possible to impart appropriate flexibility to the glass film (2), to alleviate overstress applied to the glass film (2) when winding the glass film (2), and to prevent the glass film (2) from breaking. In a case where the thickness of the glass film is less than 1 µm, strength of the glass film (2) is unsatisfactory. In a case where the thickness of the glass film exceeds 200 µm, there is increased a risk in that the glass film may break due to tensile stress when the glass film (2) is wound into a roll with a small diameter. Therefore, both cases are not preferred.

An arithmetic average roughness Ra of each end surface in a width direction of the glass film (2) is preferably 0.1 µm or less, and more preferably 0.05 µm or less. This is because it is possible to impart appropriate smoothness to the each end surface in the width direction of the glass film (2). Therefore, in this case, when the glass film (2) is wound into a roll, small flaws are less likely to occur on the each end surface of the glass film (2), and hence it is possible to wind the glass film (2) without any trouble. Further, it is possible to reduce glass powder, which is generated due to a chip and the like resulting from the small flaws on the end surface of the glass film (2), and hence there is an advantage in ensuring cleanness of the front and back surfaces of the glass film (2). In addition, even in a case where the end surface of the glass film (2) is held in contact with the protective sheet (3), the end surface of the glass film (2) does not bite into the protective sheet (3), and the glass film and the protective sheet can be separated from each other easily. Consequently, prevention of breakage of the glass film (2) is achieved.

When the scribe line is formed in a surface of the glass film (2) along a length direction with use of a diamond cutter or the like, and then bend-breaking is performed, it is preferred that the glass film (2) be wound so that the surface with the scribe line is situated on an inner circumferential side. The reason is as follows. Small flaws occur on a groove of the scribe line thus formed, and hence, when the glass film (2) is wound so that the surface with the scribe line is situated on an outer circumferential side, the glass film (2) may break due to the tensile stress from the small flaws on the groove of the scribe line as an origin of breakage. However, in a case where, due to thermal stress that is generated through expansion caused by a heat source such as laser and through contraction caused by a refrigerant, an initial crack develops and then the glass film (2) is split, that is, in a case where the glass film (2) is cut by a method in which no small flaws occur on cut surfaces basically, a winding direction of the glass film (2) is not limited. Further, by performing bend-breaking after formation of the scribe line and then performing fire polishing and chemical polishing, it is possible to process the end surface of the glass film (2).

When winding the glass film (2), stress is concentrated on the end surface of the glass film (2) so that the glass film may break. Therefore, it is preferred that the end surface portion of the glass film (2) be protected with a resin film or the like. In this case, the glass roll (1) is produced by superposing the resin film on the glass film (2) in a region within 1 to 2 cm from the each end surface of the glass film (2) and winding the resin film and the glass film. Further, in a case of using an adhesive resin film, even when a crack occurs in the end surface of the glass film (2), it is possible to prevent development of the crack.

In a case where the glass film (2) is pulled out of the glass roll (1), and then the glass film (2) is supplied to various steps as processing steps, when the glass film (2) is supplied to the steps while being directly held, a leading end portion of the glass film (2) may break due to contact with a member of the device. Therefore, it is preferred that the resin film be attached at the time of start of winding of the glass film (2) (leading end) and at the time of end of winding (trailing end). The resin film is less likely to break than the glass film (2), and hence the glass film can be supplied to the steps while the resin film is held. As a result, it is possible to facilitate the supply to the steps. The resin film is superposed and attached onto each of the leading end portion and the trailing end portion of the glass film (2) in the attaching region within approximately 1 to 2 cm from each of the leading end portion and the trailing end portion, and then winding is performed so that the glass roll (1) is obtained. A length of the resin film is not particularly limited. For example, the length of the resin film may be set to correspond to a length of a contour of the glass roll (1). Further, it is preferred that the resin film have adhesiveness and an elastic modulus smaller than that of the glass film (2).

The glass film (2) is manufactured using the manufacturing device illustrated in FIG. 2. Just after flowing from a lower end portion (41) of a forming trough (4) with a wedge-shaped cross-section, a glass ribbon (G) is drawn downward by cooling rollers (5) while being restricted from contracting in the width direction, to thereby be thinned to have a predetermined thickness. Next, the glass ribbon (G) having the above-mentioned predetermined thickness is gradually cooled by a lehr (annealer), and thermal strain of the glass ribbon (G) is subtracted. In this way, the glass film (2) is formed.

In the present invention, it is preferred that the glass film (2) be formed by the overflow downdraw method, as illustrated in FIG. 2 and FIG. 5. The reason is as follows. The overflow downdraw method is a forming method in which both surfaces of a glass plate are not held in contact with a forming member during forming, and hence flaws are less likely to occur on the both surfaces (translucent surfaces) of the obtained glass plate, and high surface quality can be obtained without polishing.

When winding the glass film (2), the protective sheet (3) prevents occurrence of the flaws, which is caused by contact of one part of the glass film (2) with another, and the protective sheet is used for absorbing external pressure when the external pressure is applied to the glass roll (1). Therefore, it is preferred that a thickness of the protective sheet (3) be from 10 µm to 2000 µm. In a case where the thickness is less than 10 µm, cushioning performance of the protective sheet is unsatisfactory. In a case where the thickness exceeds 2000 µm, there is extremely increased a roll outer diameter of the glass roll formed after winding the glass film (2). Therefore, the both cases are not preferred.

When producing the glass roll (1) according to the present invention, a temperature of the glass film (2) may exceed 50° C. Thus, it is preferred that the protective sheet (3) be not transformed, for example, softened at a temperature of about 100° C.

It is preferred that the protective sheet (3) be slightly larger than the glass film (2) in the width direction. That is, it is preferred that, in a state of the glass roll (1), the protective sheet (3) extend beyond both sides in the width direction of the glass film (2). The reason is as follows. With this configuration, each end surface in the width direction of the glass film (2) is protected with the protective sheet (3), and hence it is possible to prevent small flaws and chips due to impact or the like from occurring on the each end surface in the width direction of the glass film (2).

As the protective sheet (3), there can be used an ionomer film, a polyethylene film, a polypropylene film, a polyvinyl chloride film, a polyvinylidene chloride film, a polyvinyl alcohol film, a polypropylene film, a polyester film, a polycarbonate film, a polystyrene film, a polyacrylonitrile film, an ethylene vinyl acetate copolymer film, an ethylene-vinyl alcohol copolymer film, an ethylene-methacrylate copolymer film, a polyamide resin film (nylon film), a polyimide resin film, a buffer made of a resin such as cellophane, an inserting paper, and a nonwoven fabric. It is preferred that a polyethylene foam sheet be used as the protective sheet (3), because the polyethylene foam sheet can absorb impact, and has high strength with respect to tensile stress. Meanwhile, when silica or the like is dispersed in those resin films so that a degree of slip on the glass film (2) is increased, the slip can preferably absorb a difference of lengths to be wound, which results from a slight difference of diameters caused when the glass film (2) and the protective sheet (3) are wound while being superposed on each other.

The glass roll (1) may be formed by winding the glass film (2) so that the protective sheet (3) is situated on the outer circumferential side, or by winding the glass film (2) so that the protective sheet (3) is situated on the inner circumferential side. In the case of winding the glass film (2) so that the protective sheet (3) is situated on the inner circumferential side, winding is started after sticking the glass film (2) on the protective sheet (3) with a tape or the like, or after, as illustrated in FIG. 3, holding the glass film (2) and the protective sheet (3) in a superposed state in a holding groove (68) provided in the roll core (6), or holding only the glass film (2).

It is preferred that conductivity be imparted to the protective sheet (3). This is because, when the glass film (2) is taken out of the glass roll (1), peeling electrification is less likely to occur between the glass film (2) and the protective sheet (3) so that the glass film (2) and the protective sheet (3) can be easily peeled off. Specifically, for example, in a case where the protective sheet (3) is made of a resin, it is possible to impart the conductivity by adding a component for imparting the conductivity, such as polyethylene glycol, into the protective sheet (3). In a case where the protective sheet (3) is made of inserting paper, it is possible to impart the conductivity by adding conductive fiber. Further, it is possible to impart the conductivity also by laminating a conductive layer, such as an indium-tin-oxide (ITO) film, on a surface of the protective sheet (3).

It is preferred that the glass roll (1) according to the present invention be wound around the roll core (6). In this way, the glass film (2) can be fixed onto the roll core (6) when being wound, and hence it is possible to wind the glass film (2) more firmly. Further, even when the external pressure is applied to the glass roll (1) obtained by winding the glass film (2), the glass film (2) is not bent inward owing to the roll core (6). Accordingly, it is possible to prevent application of extreme tensile stress onto the glass film (2), and to prevent breakage of the glass film (2) more reliably.

It is preferred that a length of the roll core (6) be longer than a width of the glass film (2). This is because it is possible to protrude the roll core (6) from side edge portions of the glass roll (1), and to prevent small flaws and chips due to impact or the like from occurring on side edge portions of the glass film (2).

As a material of the roll core (6), there can be used metals such as an aluminum alloy, a stainless steel, a manganese steel, and a carbon steel, thermosetting resins such as a phenolic resin, a urea resin, a melamine resin, an unsaturated polyester resin, an epoxy resin, polyurethane, and a diallyl terephthalate resin, thermoplastic resins such as polyethylene, polypropylene, polystyrene, an AS resin, an ABS resin, a methacrylate resin, and vinyl chloride, reinforced plastics obtained by mixing those thermosetting resins or thermoplastic resins with reinforcement fibers such as a glass fiber or a carbon fiber, and paper cores. Of the above-mentioned materials, aluminum alloy and reinforced plastic are excellent in strength, and paper allows a reduction in weight. Thus, the two materials can be preferably used. In addition, it is preferred that the protective sheet (3) be wound one or more turns around the roll core (6) in advance in order to prevent occurrence of flaws on a surface of the glass film (2).

At the time of start of winding the glass film (2) around the roll core (6), it is difficult to wind the end portion to be wound first of the glass film (2) along the roll core (6). If winding forcibly, overstress is applied to the end portion to be wound first of the glass film (2) so that the glass film may break. Therefore, it is preferred that, as illustrated in FIG. 3, the roll core (6) be provided with the holding groove (68) for holding the end portion of the glass film (2). In this case, except in a case where winding of the glass film (2) is started after inserting the glass film and the protective sheet in the holding groove (68) simultaneously while the end portion of the glass film (2) is covered with the folded protective sheet (3) as illustrated in FIG. 3(a), in a case where the holding groove (68) is made of a cushioning material (69) as illustrated in FIG. 3(b), the winding can be started after inserting only the glass film (2).

It is more preferred that the roll core (6) be removed from the glass roll (1) according to the present invention after the glass film is wound around the roll core (6). The reason is as follows. That is, the roll core (6) is removed after the glass film (2) is fixed on the roll core (6) once at the time when the glass film (2) is wound to be formed into the glass roll (1) that is more firmly wound. Thus, it is possible to achieve a reduction in weight of the glass roll (1), and to obtain the glass roll (1) more suitable for transportation.

In the case of removing the roll core (6), as illustrated in FIG. 4, it is preferred to use the roll core (6) including an inner cylinder (65) and the outer cylinder (66), which serve as coaxial sleeves having a double-circle shape, and including elastic members (67) interposed between the inner cylinder (65) and the outer cylinder (66). The reason is as follows. When pressing the outer cylinder (66) in a center direction, the elastic members (67) contract so that the outer cylinder (66) is reduced in diameter. Consequently, it is possible to easily remove the roll core (6) from the glass roll (1). In FIG. 4, the elastic members (67) are used as members for causing the outer cylinder (66) to expand and contract.

However, it is possible to adopt a configuration in which a space within the inner cylinder (65) and the outer cylinder (66) is sealed and the outer cylinder (66) is caused to expand and contract by changing fluid pressure in the internal space.

Tensile stress generated on a surface of the glass film (2) when the glass film (2) is wound to be formed into the glass roll (1) is determined by Equation 1 below.

$$\sigma = \frac{E \times \frac{T}{2}}{R + \frac{T}{2}} \quad \text{[Equation 1]}$$

Note that, in Equation 1, σ represents a tensile stress value of an outer surface of the glass film, R represents a radius of an inner diameter of the glass roll (radius of an outer diameter of the roll core), T represents a thickness of the glass film, and E represents a Young's modulus of the glass film.

Therefore, the radius R of the inner diameter of the glass roll (1) (radius of the roll core (6)) is determined by Equation 2 below.

$$R = \frac{T}{2}\left(\frac{E}{\sigma} - 1\right) \quad \text{[Equation 2]}$$

Note that, in Equation 2, σ represents the tensile stress value of the outer surface of the glass film, R represents the radius of the inner diameter of the glass roll (radius of the outer diameter of the roll core), T represents the thickness of the glass film, and E represents the Young's modulus of the glass film.

By setting the radius R of the inner diameter of the glass roll (1) to be equal to or larger than a value of the radius determined by Equation 2 described above, it is possible to more appropriately select a winding radius at the time of winding of the glass film (2). Thus, the extreme tensile stress, which results from an extremely small winding radius, can be prevented from being applied on the outer surface of the glass film (2). Consequently, it is possible to more reliably prevent breakage of the glass film (2). Note that, in the case of using the roll core (6), the radius of the outer diameter of the roll core (6) may be set to be equal to or larger than the value determined by Equation 2 described above. For example, in a case of winding a glass film with a thickness of 300 μm, when tensile stress generated on a surface of a glass substrate is about 27 MPa, the glass film can be wound around a roll core with a diameter of 1 m.

The glass roll (1) according to the present invention is manufactured using the manufacturing device illustrated in FIG. 5. In the glass film (2) formed by the overflow downdraw method (for example, OA-10G manufactured by Nippon Electric Glass Co., Ltd.: thickness, 50 μm; and width, 150 mm), in order to eliminate roller contact portions which have been subjected to contact with the cooling rollers (5), disused portions (relatively thick portions) corresponding to the roller contact portions at both end portions in the width direction of the glass ribbon (G) are eliminated by cutting means (7). As the cutting means (7), for example, means utilizing laser cutting is used. Here, as the laser cutting, means for laser fusing the glass film (2) can be used. However, in this case, the cut surface is fused by heat of laser irradiation, to thereby be thickened, which may cause a problem at the time of winding. In this context, it is preferred to utilize, as the laser cutting, splitting means (hereinafter, referred to as laser splitting) using thermal stress generated by heat of laser irradiation. In the case of utilizing the laser splitting, the glass film (2) is cut with use of the thermal stress generated by heat of laser irradiation, and hence it is unnecessary to heat the glass film (2) up to high temperature unlike in the case of fusing. Therefore, there is no such defect that the cut surface is fused to be thickened or extreme strain generates in the glass film (2) due to heat at the time of cutting. That is, it is possible to more easily wind the glass film (2), and to more reliably prevent breakage of the end portion. Further, the cut surface (split surface) by the laser splitting has a smooth cross-section with high strength, and hence the arithmetic average roughness Ra of each end surface in the width direction of the glass film (2) is 0.1 μm or less as described above without being subjected to post-processing such as polishing.

In the laser splitting utilized in this embodiment, as illustrated in FIG. 6, an initial crack (W) is formed in an end portion on a downstream side of the glass film (2), and, after scanning the glass film along a longitudinal direction of the glass film (2) with a heating point (X) of laser irradiation, the heated portion is cooled while scanning the glass film with a cooling point (Y) of a refrigerant, to thereby form a split line (Z) while causing the initial crack (W) to develop due to the thermal stress generated by heating and cooling. Here, the split line (Z) is formed continuously from a front surface up to a back surface of the glass film (2). Therefore, at the point in time when the split line (Z) is formed by developing the initial crack (W) thereby, there is cut a disused portion corresponding to the portion in which the split line (Z) is formed. Note that, under a state in which the heating point (X) of the laser and the cooling point (Y) of the refrigerant are fixed, scanning with the heating point (X) of the laser and the cooling point (Y) of the refrigerant is performed by sequentially conveying the glass film (2) to a downstream side in a conveying direction (left direction in the example illustrated in FIG. 5).

In this embodiment, as illustrated in FIG. 5, under a state in which the glass film (2) is curved from an upright posture into a laid posture, the disused portions at the both end portions in the width direction of the glass film (2) are eliminated by the cutting means (7). Then, the glass film (2), from which the disused portions are eliminated, is wound around the roll core (6) arranged at a position shifted laterally from a position directly below a forming section. Specifically, the forming section includes a forming zone (A), an annealing zone (annealer) (B), and a cooling zone (C). Then, an angle θ formed by a tangent line L1 along the glass film (2) drawn out of the cooling zone (C) included in the forming section, and a tangent line L2 along the glass film (2) at a contact point P between the roll core (6) and the glass film (2) is 90 degrees or more, and the glass film (2) drawn out of the cooling zone (C) is smoothly curved along the two tangent lines L1 and L2 while being supported by support rollers (51) from below. With this configuration, an improvement of workability is achieved by changing the posture of the glass film (2) while preventing an action of overstress onto the curved portion of the glass film (2). Note that, in this embodiment, the glass film (2) is curved to be inscribed in the tangent lines L1 and L2.

In this case, the protective sheet (3) is pulled out of a protective sheet roll (31) provided below the roll core (6), and the protective sheet (3) is superposed on an outer circumferential side of the glass film (2). Then, along the surface of the roll core (6), the glass film (2) and the protective sheet (3) are wound into a roll. In this way, after the glass film (2) is wound so as to have a predetermined roll outer diameter, a scribe is formed in the width direction of the glass film (2) with use of a width-direction cutter (not shown), and bend-breaking is performed. In this way, only the glass film (2) is cut. Then, after a trailing end of the cut glass film (2) is wound, the protective sheet (3) is further wound one or more turns in this state, and the protective sheet (3) is cut. Consequently, manufacturing of the glass roll (1) according to the present invention is completed. In this case, an outermost layer of the glass roll (1) is constituted by the protective sheet (3). However, in view of protection of the glass film (2), it is preferred that the protective sheet (3) be wound around the roll core (6) in advance and an innermost layer of the glass roll (1) be also constituted by the protective sheet (3).

Note that, as described above, in the case where the protective sheet (3) is superposed on the outer circumferential side of the glass film (2), and then the glass film (2) and the protective sheet (3) are wound, the glass film (2) and the protective sheet (3) may be simultaneously cut at a stage of having the predetermined roll outer diameter. In other words, winding is performed so that the protective sheet (3) is always situated on the outer circumferential side of the glass film (2), and hence the outermost layer of the glass roll (1) can be constituted by the protective sheet (3) without winding only the protective sheet (3) additionally.

Further, under a state in which the protective sheet (3) is superposed on the inner circumferential side of the glass film (2), the glass film (2) and the protective sheet (3) may be wound into a roll. In this case, it is preferred that, at the stage of having the predetermined roll outer diameter, after cutting only the glass film (2) in the width direction and winding the trailing end of the cut glass film, the protective sheet (3) be further wound one or more turns as it is and the protective sheet (3) be cut.

The glass film (2) is rich in flexibility due to its thinness. Thus, it is difficult to bend-break the glass film in the width direction by an ordinary method, and hence it is preferred to bend-break the glass film in the width direction by a method illustrated in FIG. 7. After the scribe line (75) is formed in the width direction by the width-direction cutter (74), the glass film (2) is conveyed as it is, and the scribe line (75) passes the pre-cutting rollers (71) as illustrated in FIG. 7(a). Then, as illustrated in FIG. 7(b), rotation speed of the post-cutting rollers (73) and winding speed of the glass roll (1) are slowed relative to rotation speed of the pre-cutting rollers (71), and a cutting roller (72) is lifted up from a conveyance line by drive means (not shown). As a result, the portion with the scribe line (75) of the glass film (2) subjected to bending is raised upward and bent, and the bend-breaking is performed through concentration of stress generated at this time. Then, the cutting roller (72) is lowered, and the winding speed of the glass roll (1) is increased after the post-cutting end portion passes the post-cutting rollers (73) as illustrated in FIG. 7(c). Thus, the glass roll (1) and the roll core (6) are replaced simultaneously with completion of the winding, and then the processing is sequentially performed. Note that, cutting of the glass film (2) in the width direction may be also performed utilizing the above-mentioned laser splitting.

In the above description, description is made of the case where the laser splitting is utilized as the cutting means (7). In this case, in comparison with a case where the scribe line is formed with a diamond cutter to perform the bend-breaking, it is possible to largely reduce generation of glass powder. Moreover, small flaws such as micro cracks can be prevented from occurring in a cut end surface, and hence it is possible to increase resistance due to tensile stress. For example, in the case of using the diamond cutter, a value of an inner diameter (S) of the glass roll (1) (diameter of the roll core) is determined with reference to a value of σ of 30 to 60 MPa in Equation 2 described above. Meanwhile, in the case of using the laser splitting, even when the value of the inner diameter (S) of the glass roll (1) (diameter of the roll core) is set with reference to the value of σ of 220 MPa, it is possible to produce the glass roll (1) without any problem. However, in a case where the glass film (2) is formed of molten glass, when taking into consideration that tensile stress resulting from strain at the time of cooling is added to an end surface of the glass film besides tensile stress resulting from shape, it is safe to set the above-mentioned value of σ up to 30 MPa.

At this time, a specific Young's modulus of the glass film (2) is preferably 29 or more and 40 or less, and more preferably 29 or more and 35 or less. The specific Young's modulus is obtained by dividing a Young's modulus by specific gravity, and is used as a scale by which an amount of bending under self-weight is measured. The glass film (2) is subjected to sequential processing using a roll-to-roll method, and is cut into a predetermined dimension at the final stage for use. At this time, the cut plate glass has high flexibility due to its thinness. Thus, when the glass film has the specific Young's modulus of less than 29, the glass film is bent more than necessary in a post-cutting step so that a trouble in the step may be induced. Therefore, the glass film is required to have a predetermined specific Young's modulus. Meanwhile, when the specific Young's modulus of the glass film exceeds 40, the glass film (2) is less likely to be bent, and hence it is difficult to form the glass roll (1).

Further, FIG. 5 illustrates a mode in which the protective sheet roll (31) is arranged below the glass film (2), and the protective sheet (3) is pulled out upward. However, there may be adopted a mode in which the protective sheet roll (31) is arranged above the glass film (2), and the protective sheet (3) is pulled out downward. Further, FIG. 5 illustrates a mode of winding the glass film (2) that is being conveyed in a substantially horizontal direction. However, there may be adopted a mode of winding the glass film (2) that is being conveyed in a vertical direction. In addition, in the above description, description is made of the case where the glass film (2) is formed by the overflow downdraw method. However, the glass film may be formed by a slot downdraw method or a redraw method.

Note that, FIG. 5 illustrates a mode of winding a long product, in which the step from forming to winding are performed sequentially. In a case of winding a short product, after the glass film (2) is cut into a plurality of pieces by a predetermined length in advance, the plurality of cut glass films (2) may be wound by batch processing. Further, a plurality of short products may be wound into one glass roll (1).

Figure 8:
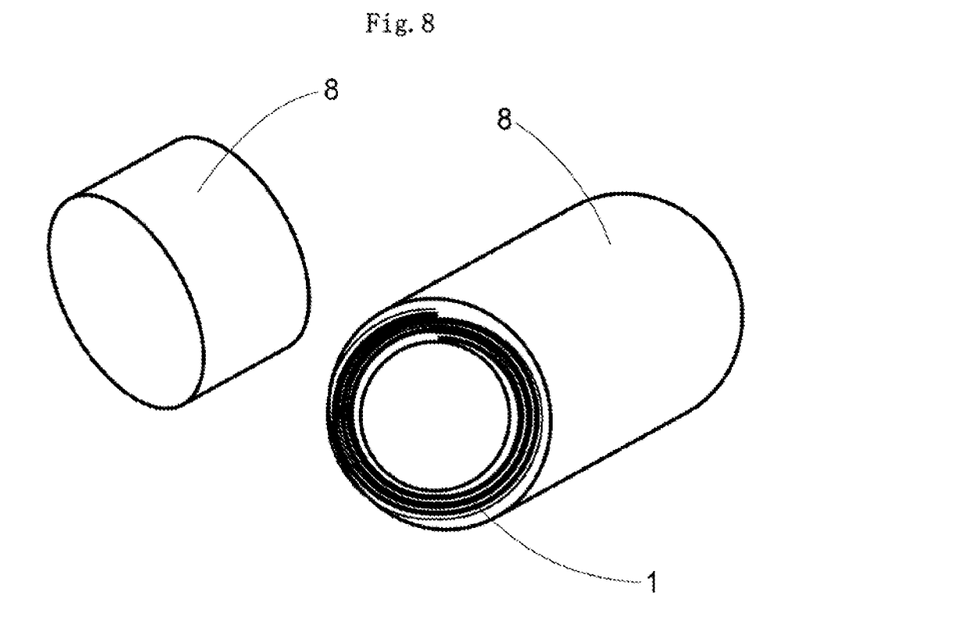
FIG. 8 A perspective view illustrating a mode of providing an outer covering body to the glass roll according to the present invention.
Figure 9:
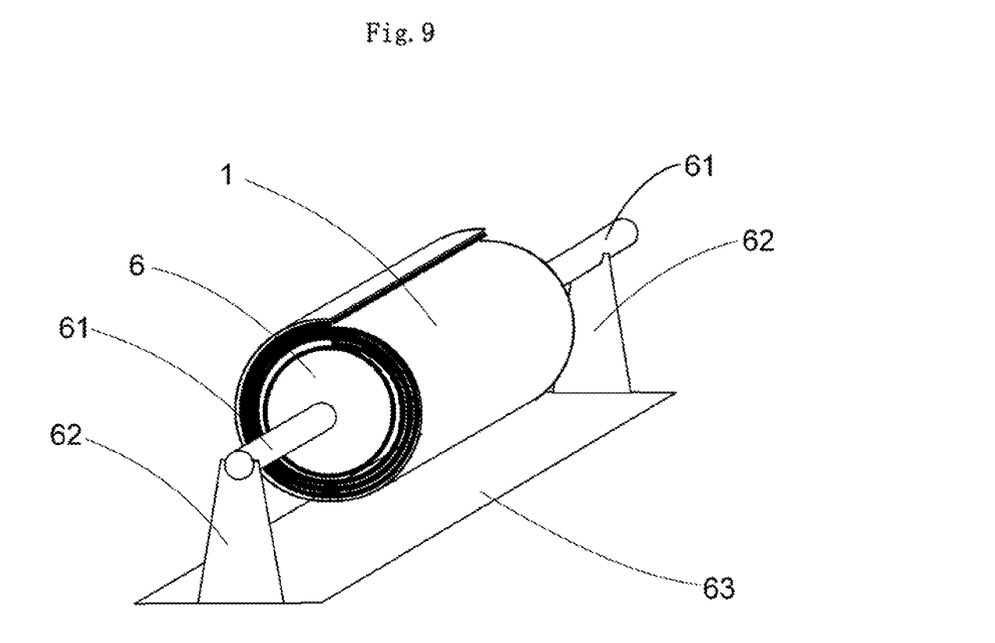
FIG. 9 A perspective view illustrating a mode of providing a support bar to the roll core of the glass roll according to the present invention.
Figure 10:
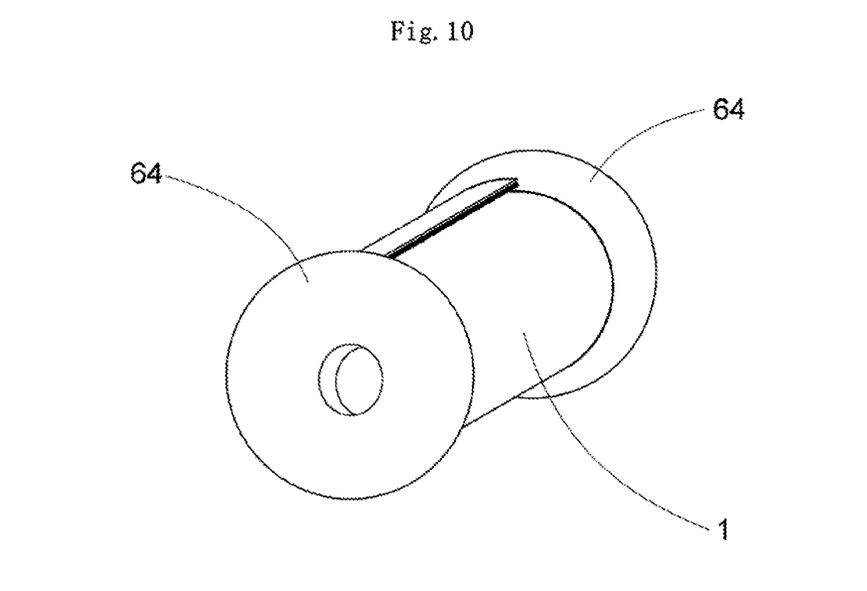
FIG. 10 A perspective view illustrating a mode of providing flanges to the roll core of the glass roll according to the present invention.
Figure 11:
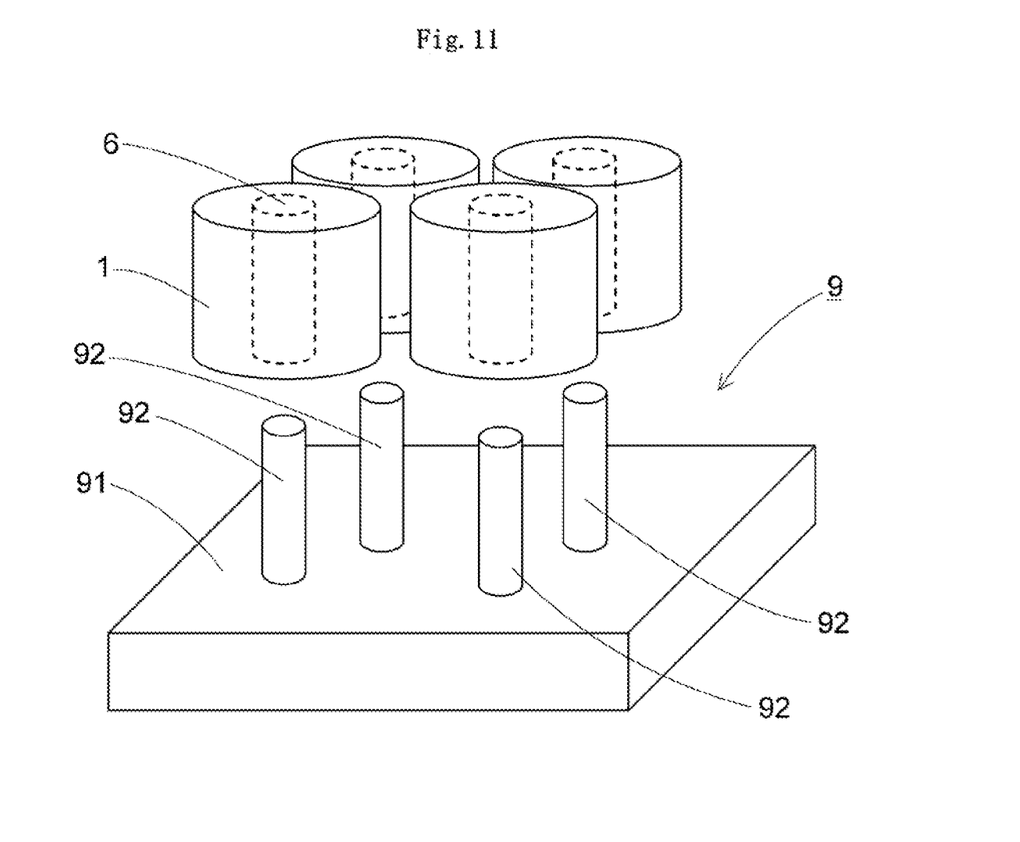
FIG. 11 An explanatory diagram illustrating a method of placing the glass roll according to the present invention in a longitudinal direction.

FIG. 8 is a perspective view illustrating a mode of providing an outer covering body to the glass roll according to the present invention. FIG. 9 is a perspective view illustrating a mode of providing a support bar to the roll core of the glass roll according to the present invention. FIG. 10 is a perspective view illustrating a mode of providing flanges to the roll core of the glass roll according to the present invention. FIG. 11 is an explanatory diagram illustrating a method of placing the glass roll according to the present invention in a longitudinal direction.

As a glass substrate for a display such as a liquid crystal display or an OLED display, there is required clean glass free from adhesion of dust, dirt, and the like for its use. Therefore, as illustrated in FIG. 8, a cylindrical outer covering body (8) is provided, and internal gas is replaced with clean gas. Consequently, a clean state can be maintained. Further, a flat-plate-shaped lid body is swaged and fastened to a cylinder body in a clean room, to thereby allow canning sealing. In addition, by packaging the glass roll (1) with a shrink film (constituting a packaging container) in the clean room, a clean state can be maintained.

When the glass roll (1) according to the present invention is placed in a lateral direction, because its weight is large particularly in the case of a long product, the glass roll breaks from a placed surface side due to the self-weight. Therefore, in order to prevent the glass film (2) wound into the glass roll (1) from being held in direct contact with the placed surface, it is preferred that, as illustrated in FIG. 9, a shaft (61) be provided to the roll core (6) and arranged on a pedestal (63) including bearings (62). In addition, it is preferred that, after the glass roll (1) is arranged on the pedestal (63), the entire glass roll be covered with a packaging box (constituting a packaging container) (not shown). This is because a clean state can be maintained by replacing the air inside the packaging box with clean air. Every single glass roll (1) may be packaged in the packaging box, or a plurality of glass rolls (1) may be packaged in one packaging box together. In addition, by adopting a mode of taking the glass roll in and out of the packaging box in such a manner that the pedestal (63) is fixed in the packaging box and the shaft (61) of the glass roll (1) is hung by a crane or the like, the pedestal (63) is firmly fixed in the packaging box during transportation, and hence excellent safety is provided.

It is preferred that, as illustrated in FIG. 10, flanges (64) be provided to both end portions of the roll core (6), respectively, so as to prevent the glass film (2) from being held in direct contact with the placed surface. The reason is to prevent the glass film (2) wound into the glass roll (1) from being held in direct contact with the placed surface. Although the flanges illustrated in FIG. 10 have circular shapes, flanges having polygonal shapes can prevent the glass roll (1) from rolling when being placed on a floor surface. The flanges (64) may be removably attached to the roll core (6). In this case, only the roll core (6) is used at the time of winding and rewinding, and the flanges (64) for protecting the glass film (2) are attached during transportation and storage.

In a case where the glass film (3) is slid on the roll core (6) during transportation or the like, there is a risk in that an end surface of the glass film (2) comes into contact with the flange so that the glass film may break. Therefore, in the case of the mode of providing the flanges (64), it is preferred that a width of the protective sheet (3) be larger than a width of the glass film (2). The reason is as follows. When the width of the protective sheet (3) is large, even if the glass film (2) is slid on the roll core (6), the end surface does not come into direct contact with the flange (64), and hence it is possible to prevent breakage of the glass film (2). Note that, it is preferred that inner surfaces of the flanges (64) be also protected with members having a cushioning action.

As described above, when the glass roll (1) according to the present invention is placed in the lateral direction, the glass roll breaks due to its self-weight. Therefore, in order to prevent the glass film (2) wound into the glass roll (1) from being held in direct contact with the placed surface, it is preferred that the glass roll (1) be placed in the longitudinal direction using a packaging device (9) illustrated in FIG. 11. The packaging device (9) includes a base portion (91) and columnar portions (92) provided upright on the base portion (91). As illustrated in FIG. 11, the glass roll (1) is placed on the base portion (91) in the longitudinal direction so that each of the columnar portions (92) is inserted into the roll core (6) of the glass roll (1). In this way, even if the glass roll (1) is shaken during transportation, the glass roll (1) is fixed by each of the columnar portions (92), and hence it is possible to prevent breakage of the glass film (2), which results from impact of the glass roll on another glass roll. It is preferred that the columnar portions (92) be removably attached to the base portion (91). Removable attachment can facilitate loading and unloading of the glass roll (1). The columnar portions (92) are provided upright with intervals large enough to prevent the impact of the glass roll (1) on another glass roll when the glass roll (1) is placed. In order to prevent shaking during transportation, a cushioning material may be filled between the glass rolls (1). It is preferred that the base portion (91) be provided with a hole for a forklift. Further, with provision of a box body (not shown), tight package is possible.

Figure 12:
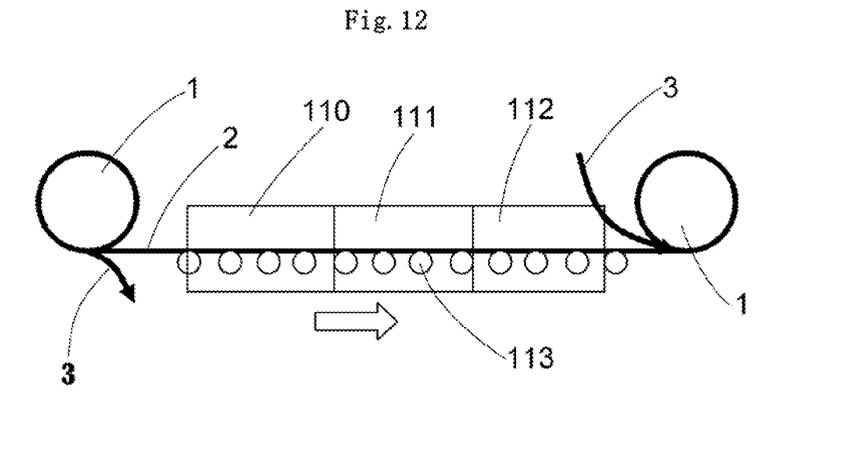
FIG. 12 A view illustrating a processing method for the glass roll according to the present invention.
Figure 13:
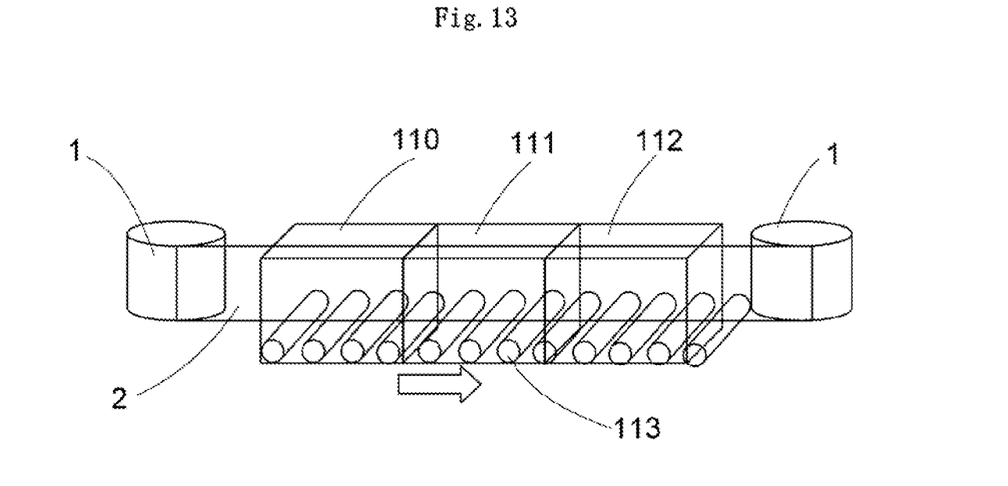
FIG. 13 A view illustrating another processing method for the glass roll according to the present invention.
Figure 14:
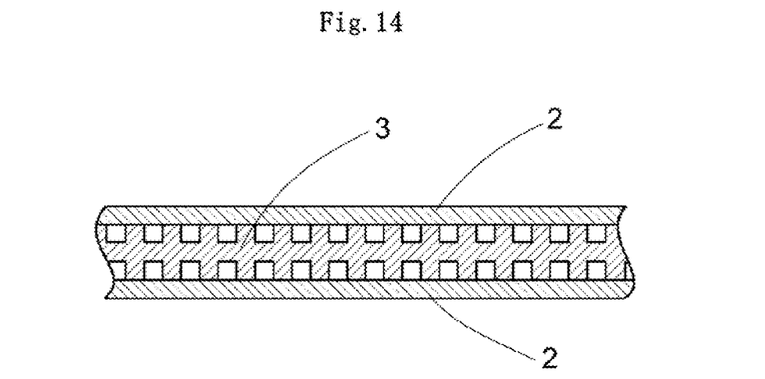
FIG. 14 A view of the protective sheet having a surface subjected to embossing.

FIG. 12 is a view illustrating a processing method for the glass roll according to the present invention. FIG. 13 is a view illustrating another processing method for the glass roll according to the present invention. FIG. 14 is a view of the protective sheet having a surface subjected to embossing.

When performing processing, such as cleaning and drying, on a glass substrate, only one-by-one conveyance is possible for a conventional rectangular glass substrate. However, the glass roll (1) according to the present invention can be subjected to sequential processing using the roll-to-roll method. For example, by a method illustrated in FIG. 12, it is possible to perform sequential processing, i.e., a cleaning step (110), a drying step (111), and an antistatic step (112), using the roll-to-roll method. The glass film (2) has flexibility, and hence it is possible to soak the glass roll in a cleaning tank in the cleaning step (110). When the glass roll (1) according to the present invention is subjected to sequential processing using the roll-to-roll method, it is preferred that, as illustrated in FIG. 13, the sequential processing be performed under a state in which the glass roll (1) is placed upright. The glass film (2) has rigidity higher than that of the resin film, and hence the roll-to-roll method can be implemented under a state in which the glass roll is placed upright. When the roll-to-roll method is implemented under the upright state, satisfactory drainage is achieved after the completion of the cleaning step, and conveying rollers (113) and a surface of the glass film (2) are not held in contact with each other. Thus, it is possible to more reliably prevent occurrence of flaws. Note that, in the processing method illustrated in FIG. 13, when the glass film (2) flutters, an upper portion of the glass film (2) may be supported by a conveying roller (not shown) provided as needed.

At this time, when using the glass roll (1), which is not dried sufficiently after the cleaning, in a step in which moisture is to be excluded strictly, it is necessary to exclude moisture adhering to a surface of glass before using the glass roll, and hence it is necessary to dry the glass roll (1) in a roll state sufficiently before the glass roll (1) is introduced into the step. In this case, as illustrated in FIG. 14, it is preferred to use the protective sheet (3) having a surface with asperities, which is subjected to embossing or the like. The reason is as follows. A surface of the protective sheet (3) is not entirely held in contact with the glass film (2), and hence the protective sheet is excellent in breathability and allows fast drying of the glass film (2). Further, it is preferred that the roll core (6) have a structure excellent in breathability with provision of a hole, a slit, or a mesh. In addition, it is preferred that a heater be arranged on a hollow portion of the roll core (6) and drying be performed by heating from an inside of the roll core (6). After the drying, the glass roll (1) is sealed, for example, in the outer covering body (constituting a packaging container) illustrated in FIG. 8, and a desiccant or the like is put inside the outer covering body. In this way, the dried state can be maintained. Further, an end surface of the glass roll (1) can be provided with a sheet-like desiccant (for example, sheet containing silica gel), and be covered with a moisture-proof film (such as metal layer deposited film).

INDUSTRIAL APPLICABILITY

The present invention can be preferably used to a glass substrate of a device used for a flat panel display, such as a liquid crystal display or an OLED display, and for such as a solar cell, and used to cover glass for an OLED lighting.

REFERENCE SIGNS LIST

1 glass roll
2 glass film
3 protective sheet
4 forming trough
6 roll core

The invention claimed is:
1. A glass roll comprising:
a roll core;
a glass film having exposed front and back surfaces; and
a protective sheet,
wherein the glass film and the protective sheet are wound around the roll core so that the glass film is superimposed on the protective sheet, and
wherein a leading end of the protective sheet extending from an innermost layer of the protective sheet is wound one or more turns around the roll core prior to a leading end of the glass film extending from an innermost layer of the glass film being located on the protective sheet and wound around the roll core.
2. The glass roll according to claim 1, wherein the protective sheet is superposed on an outer circumferential side of an outermost layer of the glass film.
3. The glass roll according to claim 1, wherein each side surface of the glass film includes a surface that was laser split.
4. A glass roll package body comprising:
a glass roll according to claim 1; and
a packaging container housing the glass roll therein, the packaging container covering the entire glass roll.
5. The glass roll package body according to claim 4, wherein the packaging container houses a desiccant therein together with the glass roll.
6. The glass roll package body according to claim 4, wherein the glass roll is supported by a support body in the packaging container, the support body comprising:
a pedestal; and
bearings to support the roll core, the bearings provided to the pedestal,
wherein the glass roll supported by the bearings is separated from the pedestal.

* * * * *